(12) United States Patent
Franckart

(10) Patent No.: US 6,768,447 B2
(45) Date of Patent: Jul. 27, 2004

(54) METHOD FOR SECURE DETERMINATION OF AN OBJECT LOCATION, PREFERABLY A VEHICLE MOVING ALONG A KNOWN COURSE

(75) Inventor: Jean-Pierre Franckart, Montignies-Sur-Sambre (BE)

(73) Assignee: Alstom Belgium S.A., Charleroi (BE)

( * ) Notice: Subject to any disclaimer, the term of this patent is extended or adjusted under 35 U.S.C. 154(b) by 0 days.

(21) Appl. No.: 10/327,583
(22) PCT Filed: Jun. 29, 2001
(86) PCT No.: PCT/BE01/00114
§ 371 (c)(1), (2), (4) Date: Dec. 20, 2002
(87) PCT Pub. No.: WO02/03094
PCT Pub. Date: Jan. 10, 2002

(65) Prior Publication Data
US 2003/0169203 A1 Sep. 11, 2003

Related U.S. Application Data
(60) Provisional application No. 60/215,607, filed on Jun. 30, 2000.

(30) Foreign Application Priority Data
Jun. 30, 2000 (EP) ............................................. 00870153

(51) Int. Cl.⁷ ............................ H04B 7/185; G01S 3/02; G01C 21/26
(52) U.S. Cl. ............. 342/357; 342/357.08; 342/357.12; 342/455; 342/457; 701/214; 701/301
(58) Field of Search ............................. 342/357, 357.02, 342/357.08, 357.09, 357.12, 457, 455; 701/301, 213, 214

(56) References Cited

U.S. PATENT DOCUMENTS

| 5,296,861 A | * | 3/1994 | Knight .................. 342/357.11 |
| 5,867,122 A | | 2/1999 | Zahm et al. |
| 5,977,909 A | | 11/1999 | Harrison et al. |

FOREIGN PATENT DOCUMENTS

| EP | 0 791 518 | 8/1997 |
| WO | WO 89/05255 | 6/1989 |

* cited by examiner

Primary Examiner—Thomas H. Tarcza
Assistant Examiner—F H Mull
(74) Attorney, Agent, or Firm—Knobbe Martens Olson & Bear LLP

(57) ABSTRACT

A device for determining the location or the position of an object moving along a known course includes equipment associated with the object. The equipment includes at least one central computer, at least one receiver/decoder of signals originating from one or more satellites, a radio interface and a database having a mapping of the course of the object. The device includes further central equipment including a central computer, one or more radio interfaces, a bus system, a database including the mapping of the course, an application for managing modifications of the mapping and at least one console, and moving-object/central-equipment and man/moving-object interface elements.

13 Claims, 3 Drawing Sheets

METHOD FOR SECURE DETERMINATION OF AN OBJECT LOCATION, PREFERABLY A VEHICLE MOVING ALONG A KNOWN COURSE

This application claims the benefit of Provisional Application No. 60/215,607 filed Jun. 30, 2000.

FIELD OF THE INVENTION

The present invention relates to a method for securely determining the location and/or the positioning of an object moving along a course which is known by the location device.

The term "course" is intended to mean a subset of the space delimited by a tubular surface of arbitrary and variable cross section, in which the vehicle is strictly constrained to move. In the event that the cross section of this tube can be neglected, this gives two equations linking longitude, latitude and altitude of the moving object.

The present invention relates more precisely to a method for determining the location of a train moving on a railway track whose exact path is known.

The same principle can be applied to the case in which a single equation is known (movement of the moving object on a known surface).

The present invention relates to a method for determining the location and/or the positioning of a vehicle, this securely in terms of railway transport, that is to say it involves being able to determine the location, or more precisely the zones of non-presence of said vehicle on a section, this quasi-instantaneously, for a vehicle moving on a known course, and doing so with a given probability.

This location is based on the use of navigation satellites or equivalent terrestrial navigation beacons, generically referred to below as "satellites".

DESCRIPTION OF THE RELATED TECHNOLOGY

In railway signaling, a train is not permitted to enter a specific section of track until it is certain that the train in front has departed therefrom, that is to say that the track section in question is free. To that end, it is necessary to ascertain with a margin of error which is predetermined, and of course extremely small, and to do so securely in terms of railway transport; for example with a maximum error level of the order of $10^{-9}$ and preferably of the order of $10^{-12}$, the zones in which non-presence of a train can be relied upon, and to do so at each iteration of the calculation.

It is known to determine the precise location of an object, and a fortiori of a train, with the aid of calculation of the position with respect to three satellites, the receivers that can receive the information from said satellites being capable of calculating the coordinates of said moving object with a relatively high precision.

However, it is necessary to add a precise measurement of the universal time, which may prove to be complex and sometimes costly to implement at the level of a receiver, for example one arranged in the train. Furthermore, it should be noted that it is necessary for the various satellites to belong to the same constellation and for them to use the same reference time.

For this reason, a fourth satellite is generally used, which permits precise location of the object in question by solving a system of four equations with four unknowns, so as to obtain the three coordinates of the point in question and the value of the time.

In reality, on the basis of knowledge of the coordinates of these satellites, an estimate is made by calculating the distance separating said satellites from the receiver object whose location is intended to be estimated.

Numerous strategies for increasing the quality and/or the quantity of information being used, in both the civilian and military fields, have made it possible to improve the precision of these measurements.

To that end, the following may be mentioned, inter alia:
- increase of the number of satellites involved in the measurement (including on the ground),
- correlation between successive measurements in order to reduce the weight of certain causes of errors,
- radio broadcasting (via satellite or otherwise) of local correction information (DGPS, WAAS, for example),
- increase of the precision of the timing measurement by synchronisation with the carriers of the satellites,
- use of maintenance and control information broadcast by the ground monitoring network or networks of the constellations of satellites.

These various items of information are compiled in order to refine as much as possible the most probable value of the position of the object of interest and to increase its precision.

Furthermore, coding and autocorrelation techniques have also been suggested in order to assure protection against electromagnetic interference or malicious acts liable to occur when measurements are being taken.

Lastly, for certain applications, the satellite location system may be supplemented with complementary sensors, which can further improve the quantity or the quality of the available information, for example atmospheric pressure sensors in aeronautics, train-axle rotation sensors coupled with a Doppler radar, partial or complete inertial stations, etc.

SUMMARY OF CERTAIN INVENTIVE ASPECTS

It is therefore an aim of the present invention to describe a method and a device which permit secure location and/or positioning of an object, and thus a fortiori of a vehicle such as a train, moving on a known course.

The term secure location is intended to mean the location, or more exactly the non-presence of a train outside a zone which is redefined at each calculation, with a error level of less than $10^{-9}$ and preferably capable of reaching $10^{-12}$.

The present invention relates to a method for determining the location and/or the positioning of an object, in particular a vehicle such as a train, moving along a known course, and this securely in terms of railway transport, characterised in that said location and/or said positioning of said object is determined by a valid calculation at a given time based on the one hand, on an elementary measurement involving at least one satellite and, on the other hand, on a secure mapping of said known course.

Preferably, said secure mapping makes it possible to obtain two relationships with three unknowns representing the coordinates of said object whose location and/or positioning is intended to be ascertained, while at least one other relationship between the same three unknowns is obtained with the aid of the information transmitted by at least one satellite whose position is known.

More precisely, the present invention relates to a method in which each elementary measurement consists in determining an individual domain along said course between two mileage points, said domain depending on the standard deviation of the timing measurement errors of said elementary measurement, the speed of light, a coefficient linked with the coordinates of said satellite in question and the course of the track, and a weighting factor defining the geometry of the error distribution for any measurement recording, so that the probability of non-presence of the train in said individual domain is predefined.

Advantageously, each measurement recording is redundant, which makes it possible to determine a plurality of individual domains by a plurality of elementary measurement recordings carried out simultaneously at the same given time, which are based on different satellites or on pairs of satellites.

According to a first embodiment, an elementary measurement will be carried out with the aid of a pair of satellites using the same reference time. Preferably, the pair of satellites will belong to the same constellation.

According to another preferred embodiment, an elementary measurement will be carried out with the aid of at least one satellite belonging to a constellation and a receiver linked with the object moving along the known course, said receiver having a clock synchronised with the reference time of said constellation to which the satellite belongs.

This means that it is sufficient to increase the number of satellites in order to take a plurality of elementary measurements simultaneously.

Preferably, the existence of a common domain is determined, which is defined as the intersection of the, and preferably of all the, various individual domains. Particularly advantageously, the individual domains which have no point in common with the common domain are rejected.

Hence, if there is a non-null common domain, the domain of possible presence of the moving object is determined as the union of the non-rejected individual domains.

It is deduced from this that the probability of non-presence outside the union domain is defined as the product of the probabilities of non-presence in the known individual domains.

According to a preferred embodiment, the individual domains defining the union domain depend on a parameter defining the geometry of the error distribution which is greater than or equal to the parameter selected for determining the individual domains defining the common domain.

The invention also relates to a device for determining the location and/or the positioning of an object, preferably a vehicle such as a train, moving along a known course, and this securely in terms of railway transport, comprising at least:
- equipment associated with said object, said equipment comprising at least one central computer, at least one receiver/decoder of signals coming from one or more satellites, a radio interface and a database comprising the mapping of the course executed by said object,
- central equipment comprising a central computer, one or more radio interfaces, a bus system, a database comprising the mapping of the course, an application for managing the modifications of said mapping and at least one console, as well as moving-object/central-equipment and man/moving-object interface elements.

Advantageously, the receiver/decoder comprises a clock synchronised with the reference time of the constellation of satellites.

Preferably, the device of the invention furthermore comprises a plurality of complementary sensors.

Preferably, the central equipment is optionally portable.

The method for determining the location and/or the positioning of an object, and more particularly of a train, moving along a known course, can in fact be interpreted according to two different modes of operation:
- the linear mode, when the train is travelling along a track with no branching in the vicinity of its position, and
- the topological mode, when the train is going to enter a switching-points zone or when it is not yet possible to be sure that it has departed therefrom.

The present invention relates more precisely to the location of a train moving in linear mode.

In the event of movement in topological mode, that is to say in a switching-points zone, for example, examples of implementation are described below which make it possible to revert rapidly from the topological mode to the linear mode, and therefore to apply the method according to the present invention Of course, any generalisation to a vehicle moving along a known course may be made, for example to a boat moving on a canal network, a car moving on a motorway whose exact course is known, etc.

It should be noted that, in the field of railway signaling, the course of the object, and more precisely of the train, is known with precision and securely. It is therefore simply expedient to check that a train is not approaching a dangerous point (specific section of track) and to signal its presence to the train following it, until the latter can enter without any risk of colliding with it.

The refresh time in a railway system should be at most from one to a few seconds.

The Linear Mode

In this mode, the train is localised in terms of a domain defined by two mileage points, that is to say as a confidence interval defined by two curvilinear coordinates in which, for an identified track whose exact path is known (or at the very least if not the exact path, the probable path in the securely sense of the term), it is possible to define the non-presence of a train with an error level which is as small as necessary.

The mapping of the track gives two securely known equations between three coordinates (altitude, latitude and longitude). The mapping is stored in a secure database and is loaded on board the train at the start of service, while guaranteeing the integrity of the contents by the conventional railway transport secure means: coding, redundancy. Its updating, when appropriate, is preferably managed by a suitable protocol.

The third equation will be given by an elementary measurement involving at least one satellite, and preferably a pair of satellites. It is:
- either a measurement of the transmission time between a satellite and the receiver arranged on the moving object (the train), which defines the distance between said satellite and the receiver, this being done in the event that said receiver has a clock synchronised with the reference time of the constellation to which the satellite belongs,
- or a measurement of the difference between the transmission times of each of the satellites of a pair of satellites and their receiver arranged in the moving object (the train), in the event that said receiver is not provided with a clock synchronised with the reference time of the constellation to which the satellites belong.

It should be noted that, in the case of recording an elementary measurement with the aid of two satellites, belonging preferably to the same constellation, or at the very least to constellations using the same reference time, it will not be necessary for the receiver arranged in the train to have a clock synchronised with this reference time.

Conversely, in the case in which an elementary measurement is carried out with a single satellite, it is essential for the receiver arranged in the train to be provided with a clock synchronised with the reference time of the constellation to which this satellite belongs.

This increases the implementation cost of the method according to the present invention, but will reduce the number of satellites needed for each elementary measurement.

During an elementary measurement (i=1), an attempt will therefore be made to determine, using a system of equations (three or four) with a plurality of unknowns (three or four), the positioning of said moving vehicle, or more precisely the domain $D_i$ defined on the course by the two mileage points $M^i_{min}$ and $M^i_{max}$, which are counted from a reference that is arbitrary but unique for each line, and which are separated by a distance $2 \eta_a c \sigma_i \alpha_i$, where $\eta$ is a dimensionless coefficient defining the geometry of the error distribution, c is the speed of light, $\sigma_i$ is the known standard deviation of the timing measurement errors, and $\alpha_i$ is a dimensionless coefficient linked with the coordinates of the satellites and with the course of the track.

If $\sigma_1$ denotes the known standard deviation of the timing measurement errors during this first elementary measurement, performed for example with the aid of a first pair of satellites, then $\pm\eta_a \sigma_1$ may be regarded as being the limit of the measurement error with a probability $P_a$ ($10^{-2}$ to $10^{-4}$, for example), which defines $\eta_a$ as a dimensionless coefficient that allows the assumption to be made that the distribution is Gaussian when an elementary measurement is taken. Usually, $\eta_a$ is between 1 and 4, and preferably between 2 and 3. Specifically, if $\eta_a$ is too great, this decreases the stringency criteria on the measurements, that is to say it increases the error level probability. Conversely, if $\eta_a$ is too small, the risk of the measurements not converging, and therefore of rejecting said elementary measurement, is increased.

$\eta_a$ and the number of elementary measurements (and therefore the number of satellites being used) need to be selected in order to achieve the predefined probability conditions.

It should be noted that $\sigma_1$ includes the random distribution errors linked, for example:

with the propagation speed of the wave in the ionosphere and the troposphere, with the relative calibration errors of the internal clocks of the satellites, with the errors between their actual position and their transmitted position, with the errors of synchronisation with the received messages, etc.

The elementary measurement is repeated k times (with k satellites or k different pairs of satellites). The k elementary measurements may be carried out by using different constellations. This determines domains $D_2a \ldots D_ka$ of the same kind as $D_1a$.

If all these domains $D_i^a$ contain a subset of mileage points which is common to them, the common domain $D_0^a$ is defined as the intersection of the domains $D_i^a$. In this case, the parameters of the subsystem of satellites which are used are in their normal mode of operation, at least for the measurement required at this moment. This may be imposed as a necessary condition in the calculation algorithm.

Furthermore, if the $D_0^a$ existence condition is satisfied, the probability of having an unknown anomaly in the subset of satellites which is being used may be neglected; such an anomaly would lead to a measurement being void, or to underestimation of the error probability in the calculated domain. In the converse case, complementary measurements may be employed by using one or two additional satellites.

It should be noted that the reasoning adopted above is carried out on the basis of pairs of satellites. The same reasoning could of course be carried out with the aid of individual satellites acting interactively with the receiver, so long as the receiver itself has a clock synchronised with the reference time of the constellation to which the satellite or satellites belongs(s). Nevertheless, the provision of a clock synchronised with the reference time of the constellation, such as a caesium clock, is still relatively expensive and it is very probable that this solution will not be directly contemplated.

If, lastly, the satellite pairs which are used belong to different constellations, or if suitable monitoring makes it possible to ensure that there is no common-mode error within a given constellation, then the probability that the actual location is outside a union domain: $D_u^b$ (defined as the union of the individual domains $D_i^b$: $2 \eta_b c \sigma_1 \alpha_1$) will be at most equal to $(P_b)^k$, which gives access to the error probabilities ranging from $10^{-9}$ to $10^{-12}$ that are necessary.

The coefficient $\eta_b$ is defined with $\eta_b \eta_a$, such that the probability $P_b$ of having a location outside the domain $2 \eta_b c \sigma_i \alpha_i$ can be selected to be as small as possible ($10^{-3}$ to $10^{-6}$, for example).

Within a given constellation, the non-presence of common-mode error may be determined, for example, by looking for the position of known fixed stations on the basis of the same pairs of satellites. An anomaly may be communicated to the trains either via the command post or via a local radio link. The time needed for this operation must then be added to the calculation time per se.

The Topological Mode

As already described above, the movement of a train in a topological mode should be reverted as quickly as possible to a movement in a linear mode, so that the method according to the present invention can be implemented.

By way of example, if one train is following another train and the track between the two does not contain any switching points, the positioning of the train behind is carried out exclusively in linear mode; its allowed limit of movement will be calculated on the basis of possible knowledge of the rear of the train in front of it, which may involve direct or indirect dialogue with this train.

Similarly, when a train is travelling towards a switching point, the system gives it the certainty that there is no other object between this switching point and itself, allowing it for example to take possession of a (single-line) token associated with the switching points.

When it is in possession of this token, it can change the switching point according to the route assigned to this train by the control centre. Having confirmation that the switching point is locked in the required position, the topology of the track for this train in the vicinity of the switching point is known: the situation has therefore reverted to the previous case and the location can again operate in linear mode, apart from the fact that it may be necessary to change the reference mileage point after having crossed the switching point in order to fix it in the new track being taken.

The token is given back to the switching point when the fact that the end of the train has departed from it has been registered; it is then available for the train following it.

Giving back the token will often entail a change of mapping (new known course).

In conclusion, the situation in this exemplary case has reverted to a linear movement mode.

DETAILED DESCRIPTION OF CERTAIN INVENTIVE EMBODIMENTS

Among the various embodiments of the method according to the present invention, the one described below is one of the most representative. It is described with reference to the figures mentioned above, which respectively describe specific or adapted elements which are arranged on board the train, in the track and at the control post.

Figure 1:
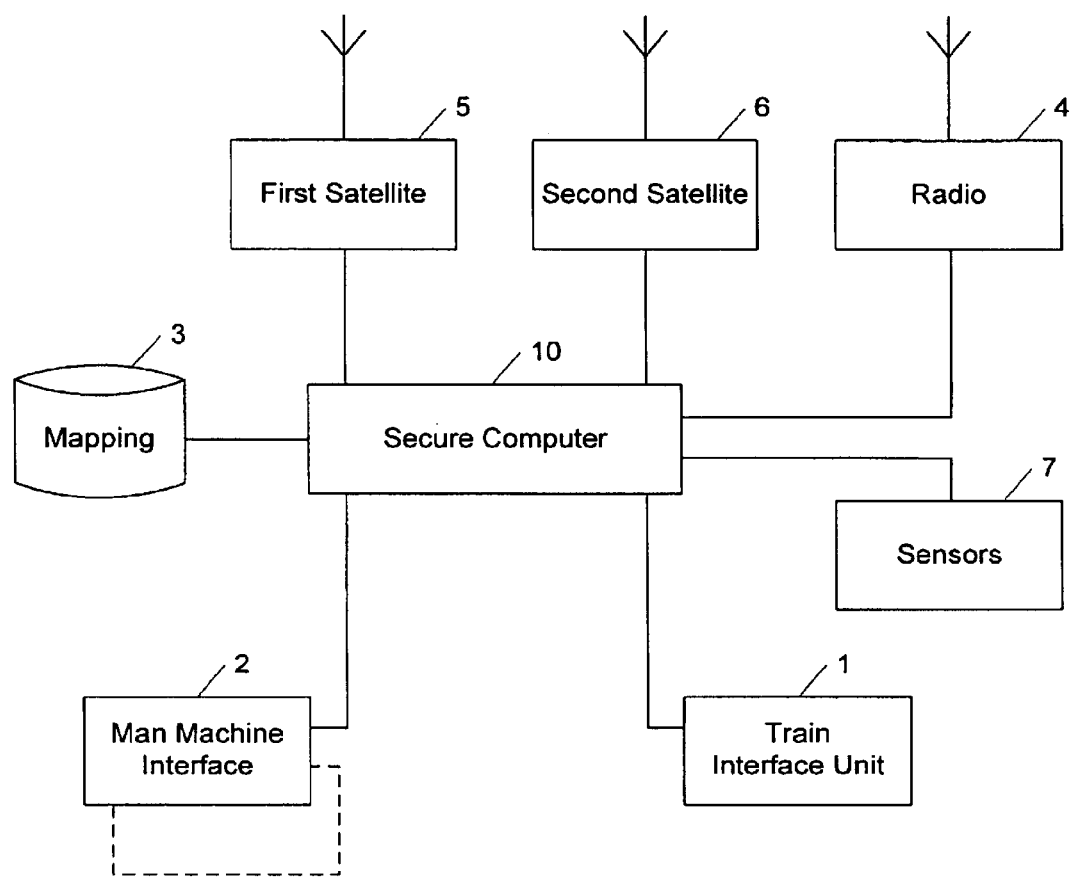
FIG. 1 represents the equipment necessary on board the train for implementing the method according to a first embodiment.

FIG. 1 represents the equipment necessary on board the train for implementing the method according to a first embodiment, in a version which is not redundant in order to improve availability.

Specifically, depending on the technology of the satellite receiver being used and of its decoder, this equipment may be duplicated so that the transmitted information concerning different satellites cannot be affected in an obviously coherent way by faults.

The Train Interface Unit (TIU) element 1 is implemented in the event that a train protection functionality (ATP) is added to the system.

The Man Machine Interface (MMI) element 2 is normally present for dialogue with the driver. It would be omitted in the case of a strict protection system, not associated with the in-cabin signaling. Two cabins of a given train may be equipped using the same secure computer 10.

The mapping 3 of the track is a memory range managed by the safety computer 10 during normal operation, furthermore with a procedure for checking its content via the radio 4 and the central post at the start of service. If an update is necessary, a suitable procedure is put in place. This may involve validation by the driver via the Man Machine Interface element 2.

The radio 4 is a standard interface for a ground-train radio of the analogue or digital type (GSM-R, for example).

The secure computer 10 (by the secure principle in terms of railway transport) employs the conventional technologies: coding (NISAL or FIDARE, for example) or redundancy (2 of 2), which are optionally associated with redundancy in order to improve availability (1 of 2, 2 of 3, 2 of 4).

The secure computer 10 is in contact with the receiver/decoder of the first satellite 5 and the receiver/decoder of the second satellite 6. Usually, these receivers/decoders are multichannel receivers/decoders and can simultaneously have links with a plurality of satellites.

According to another embodiment, it is sufficient to provide one receiver/decoder arranged in the train and having a clock synchronised with the reference time of the constellation of satellites. In this exemplary case, a single satellite is sufficient for each measurement recording.

Versions with improved availability are produced by adding, according to requirements:

additional receivers, an additional radio interface, a redundant architecture for the central computer (whose memory carries the mapping), a partially or completely redundant architecture for the Man Machine Interface (MMI) element and the Train Interface Unit (TIU) element.

Versions with improved precision are produced by optionally adding complementary sensors 7 (acceleration, gyroscopes, Doppler radars, etc.).

Figure 2:
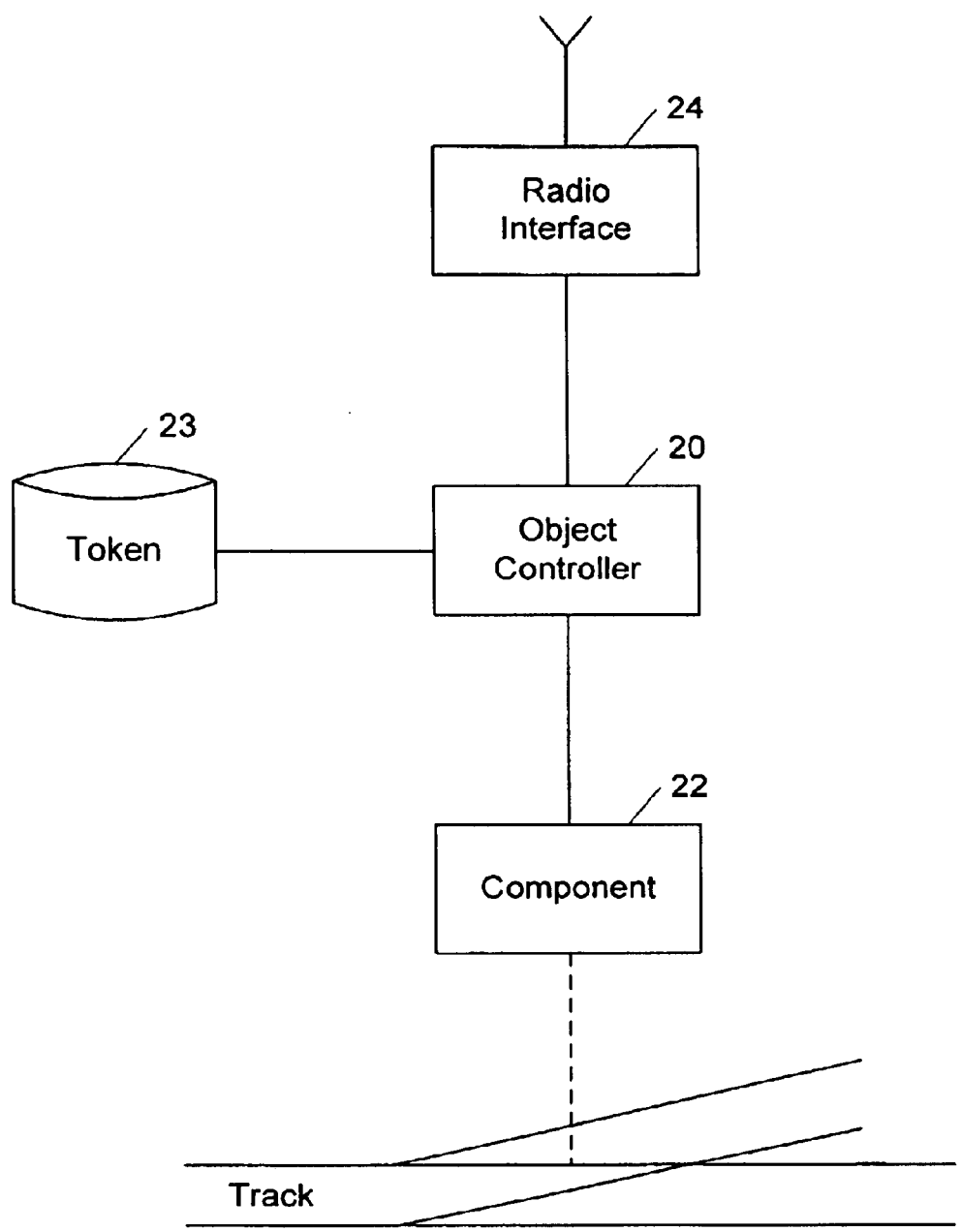
FIG. 2 represents the equipment necessary on the track for implementing the method according to a first embodiment.

FIG. 2 represents a basic version which may be redundant in order to make it possible to improve the availability of the main object-controller equipment which is necessary in the track.

If necessary, the object controller 20 controls the relevant component 22 in the track (object) and receives the pertinent checks and state variables from it. It manages the token 23 and keeps it when it is not being used by a train or by portable or fixed specialised equipment The radio interface 24 is similar to that of the on-board equipment.

As in the case of the on-board equipment, various versions with redundancy may be made.

It is also possible to contemplate track equipment which is portable and intended for the workmen on the track and for certain emergency interactions with the traffic. In particular, it allows the workmen to find where they are on the network without risk of error, to securely impose the suitable traffic limitations (and to cancel them subsequently) and optionally to receive warnings of approaching trains.

In one of its possible embodiments, the architecture of this equipment is very similar to that of the on-board equipment.

The functionalities of the Man Machine Interface (MMI) element are modified: they do not contain those which are based on dynamic information of the equipment (target distance, speed, etc.), but instead allow certain operations on the tokens of the system.

The Train Interface Unit (TIU) element becomes an interface for advising (for example audibly) of an approaching train.

In order to increase the precision in the vicinity of critical places (station entries, for example) or for the purposes of monitoring the constellation being used, equipment complementary to the fixed-track location may be arranged at suitable places. Again, this equipment is very similar to that described in FIG. 1, but in this case it includes neither a Train Interface Unit (TIU) element nor a Man Machine Interface (MMI) element. Furthermore, it is in principle not provided with token-management functionalities, but is intended only for communicating, at the request of the trains or the central post, the instantaneous location discrepancies (linear location) for each pair of satellites being used by the system which it can pick up. These discrepancies are used to reduce the confidence interval of the measurements and to validate the satellites being used.

Figure 3:
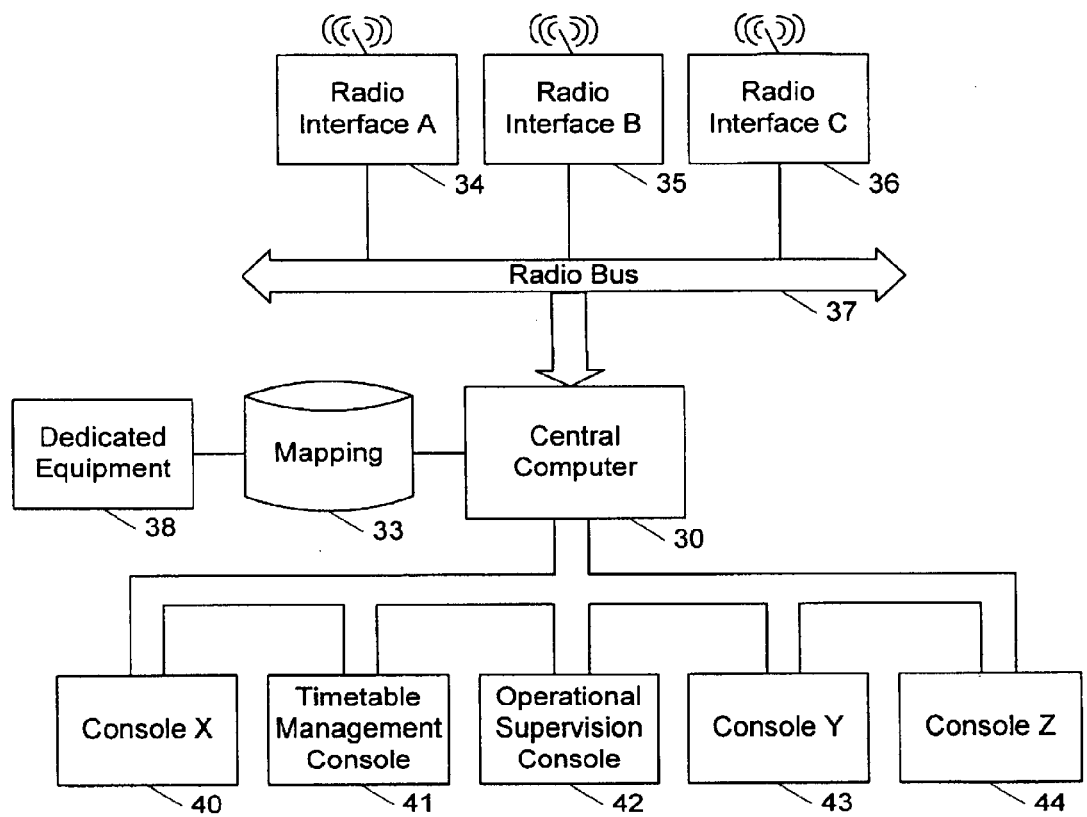
FIG. 3 represents the equipment necessary in the central post for implementing the method according to a first embodiment.

FIG. 3 describes the central post according to a preferred embodiment, which is characterised in that a minimum number of functions are processed securely. Apart from the mapping control, the basic functions of the equipment are implemented without resorting to the security at the central station.

In practice, safety equipment 40, 41, 42, 43, 44 may be added in order to implement complementary functions from the central computer 30: security for workmen on the track, various protections, remote function for compatibility with incompletely equipped engines, backup in the event of malfunction, etc.

The management of the mapping 33 is performed outside real time but securely by dedicated equipment 38.

The organisation of the system (priorities for the trains, instructions to them for establishing contact with the various object controllers in order to take their relevant tokens from them, etc.) is carried out by the central computer and the operator via the operational supervision console 42, and in compliance with the pre-established timetables via the timetable management console 41.

The maintenance monitoring and the particular interventions (emergencies, backup for partially deficient trains, etc.) may be carried out via specialised consoles 40, 41, 42, 43, 44 (as represented in FIG. 3) or via the same console as the operational supervision, for example. Specifically, the total number of consoles 40, 41, 42, 43, 44 needs to be adapted to the installation requirements.

The radio interfaces 34, 35, 36 put the central computer 30 and the satellites in communication via a radio bus 37, which is generally redundant.

What is claimed is:

1. A method of determining the location or the position of an object moving along a known course comprising:

securely mapping said known course; and performing an elementary measurement involving at least one satellite, wherein the elementary measurement comprises determining an individual domain along said course between two mileage points, said domain depending on a standard deviation of timing measurement errors of said elementary measurement, the speed of light, a coefficient linked with coordinates of said satellite and said course, and a weighting factor defining an error distribution for any measurement recording, so that a probability of non-presence of the object in said individual domain is predefined.

2. Method according to claim 1, wherein said secure mapping obtains two relationships with three unknown variables representing coordinates of said object whose location or position is to be ascertained, and wherein at least one other relationship between the three unknown variables is obtained with the aid of information transmitted by at least one satellite whose position is known.

3. Method according to claim 1, wherein the elementary measurement recording is redundant.

4. Method according to claim 3, wherein a plurality of individual domains are determined by a plurality of elementary measurement recordings carried out simultaneously, which are based on different satellites or on pairs of different satellites.

5. Method according to claim 4, further comprising increasing a number of satellites in order to record a plurality of elementary measurements simultaneously.

6. Method according to claim 5, further comprising determining an existence of a common domain, which is defined as an intersection of the various individual domains.

7. Method according to claim 6, further comprising rejecting individual domains which have no point in common with the common domain.

8. Method according to claim 7, further comprising, if there is a non-null common domain, determining a domain which is a union of non-rejected individual domains as the domain of possible presence.

9. Method according to claim 8, further comprising defining a probability of non-presence in the union domain as a product of the probabilities of non-presence in the known individual domains.

10. Method according to claim 9, wherein the individual domains defining the union domain depend on a parameter defining an error distribution which is greater than or equal to a parameter selected for determining the individual domains defining the common domain.

11. Method according to claim 1, wherein an elementary measurement is carried out with the aid of at least one pair of satellites using the same reference time.

12. Method according to claim 11, wherein the pair of satellites used for an elementary measurement belong to the same constellation.

13. Method according to claim 1, wherein an elementary measurement is carried out with the aid of at least one satellite belonging to a constellation and a receiver linked with the object moving along the known course, said receiver having a clock synchronized with a reference time of the constellation to which the satellite belongs.

* * * * *